Patented May 5, 1931

1,803,607

UNITED STATES PATENT OFFICE

GEORGE GOETZ, OF LOS ANGELES, CALIFORNIA, ASSIGNOR TO S. M. BARR AND GEORGE A. BARR, BOTH OF LOS ANGELES, CALIFORNIA

MARINE PAINT

No Drawing.     Application filed April 5, 1927.     Serial No. 181,265.

This invention has to do with a paint or covering material, and it is a general object of the invention to provide an improved paint suitable for use on parts subject to rust or exposed to plant or animal life.

In various situations, objects of various kinds are subject to oxidation and to attack by plant and animal life. I will refer, for example, to parts or objects submerged in water and, particularly, to parts or objects submerged in sea water. It is well known that objects submerged in sea water are rapidly attacked by the elements in the water and by marine life such, for instance, as barnacles, worms, etc. Paints have been proposed and used for coating or covering objects thus exposed, it being common to include in such paints arsenic, copper, and like poisonous elements for the purpose of killing life that may attack them. It is found, in practice, that ordinary paints of the type mentioned are effective for a short time only and that the poisonous properties are lost or dissipated long before the body of the paint is worn or deteriorated. Further, with ordinary paints of the type mentioned, it is necessary to apply priming coats or rust resisting or protective paint to protect the parts against rust or against the elements employed in the poisonous paint. I will refer, for example, to the practice necessary in using poisonous paint containing mercury compounds. In the case of such poisonous paints, the object to be painted must first be covered with a priming coat to protect it, or its metal parts, from the mercury in the poisonous paint.

It is a primary object of my invention to provide a paint particularly applicable to marine work and having a poisonous property which is particularly durable or long-lived.

It is another object of my invention to provide a paint of the type mentioned containing a material which is insoluble under ordinary conditions encountered in connection with marine work and which is effective in killing marine life.

Another object of the invention is to provide a paint of the character mentioned including a base of a material which of itself is poisonous to marine life.

It is another object of the invention to provide a paint in which coal tar is employed as a base and which includes an element causing the coal tar to properly harden and form a tough, durable coating that will effectively adhere to wood, metal, and other like materials, without chipping or pealing in the manner characteristic of paints employing coal tar as a base.

It is another object of the invention to provide a paint of the character mentioned which does not deteriorate after being mixed and which does not lose its characteristic properties when left exposed to air.

The paint provided by my invention is particularly suited for use in marine work, that is, for coating metal and wood structures such as boats, wharves, etc., and, therefore, I will set forth a typical form or embodiment of my invention particularly applicable to marine work, it being understood that the following description is not to be construed as limiting the invention to any specific use or to the specific details set forth.

The paint provided by my invention includes, generally, coal tar, Portland cement, sodium cyanide, kerosene and turpentine.

In carrying out my invention, I preferably use coal tar of the type or grade known commercially as genuine coal tar. The coal tar is used in my paint as the base and to give the paint body. The cement used is preferably ordinary Portland cement. The cement has several functions in the paint, that is, it acts as a binder and to harden the paint. Further, my observations indicate that it acts as a retainer of the principal poison element, that is, of the sodium cyanide. The cement itself is a desirable element in the paint as it is not readily attacked by marine life.

The sodium cyanide employed in the paint is provided as the principal poison element. The sodium cyanide is introduced in a granular, or finely divided state and, in practice, I have found it advantageous to use strong or pure sodium cyanide, that is, that grade of sodium cyanide known commercially as ninety-eight percent (98%) pure. The sodium cyanide is insoluble in the paint and my observations indicate that it remains insoluble after the paint has been applied.

The kerosene is introduced into the paint primarily as an agent to facilitate mixing of the other ingredients and, in practice, I have found it advantageous to use that liquid hydro-carbonaceous material sold under the name of kerosene, it being understood, however, that other like or similar products may be used with satisfactory results. I have found it extremely difficult to mix the various principal ingredients of my paint without an agent such as kerosene, and I have found that kerosene used in the proper quantities is very effective for this purpose.

I employ turpentine in the paint mainly for the purpose of thinning or softening the coal tar, and in accordance with the broader principles of the invention, other thinning agents may be used, for instance, I will refer to creosote.

The invention in its preferred form provides for a proportioning of the above named ingredients, which I have found to be particularly suited for marine work. For example, I have found very satisfactory results to be obtained with the following proportioning:

Coal tar, 1 gallon; Portland cement, 1 pound; kerosene, 8 ounces; sodium cyanide—98% pure, 5 ounces; turpentine, ½ pint or more, depending on the character of the coal tar.

This proportioning provides an amount of cement which satisfactorily hardens and binds the coal tar, provides an amount of sodium cyanide which gives the paint the desired poisoning property, and provides sufficient kerosene to cause the coal tar, cement and sodium cyanide to readily mix into a proper paint mixture.

Having described only a typical preferred form of my invention, I do not wish to limit myself to the specific details set forth, but wish to reserve to myself any changes or variations that may appear to those skilled in the art or fall within the scope of the following claims.

Having described my invention, I claim:

1. A paint including as its principal elements coal tar, sodium cyanide, and cement in substantially the following proportions: Coal tar, one gallon; sodium cyanide, five ounces; cement, one pound.

2. A paint including as its principal elements coal tar, sodium cyanide, kerosene, and cement in substantially the following proportions: coal tar, one gallon; sodium cyanide, five ounces; kerosene, eight ounces; cement, one pound.

In witness that I claim the foregoing I have hereunto subscribed my name this 25th day of March, 1927.

GEORGE GOETZ.